US009032309B2

(12) United States Patent
Ainslie et al.

(10) Patent No.: US 9,032,309 B2
(45) Date of Patent: May 12, 2015

(54) TEMPORAL TASK-BASED TAB MANAGEMENT

(75) Inventors: Alex Ainslie, San Francisco, CA (US); Nicholas Jitkoff, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/245,756

(22) Filed: Sep. 26, 2011

(65) Prior Publication Data

US 2012/0331408 A1 Dec. 27, 2012

Related U.S. Application Data

(63) Continuation of application No. 13/165,583, filed on Jun. 21, 2011.

(51) Int. Cl.

| | |
|---|---|
| ***G06F 3/00*** | (2006.01) |
| ***G06F 3/048*** | (2013.01) |
| ***G06F 17/30*** | (2006.01) |
| *G06F 3/0481* | (2013.01) |
| *G06F 9/44* | (2006.01) |
| *G06Q 10/10* | (2012.01) |

(52) U.S. Cl.

CPC ........ *G06F 17/30873* (2013.01); *G06F 3/0481* (2013.01); *G06F 9/4443* (2013.01); *G06Q 10/10* (2013.01)

(58) Field of Classification Search

CPC ............ G06F 17/30873; G06F 9/4443; G06F 3/0481; G06Q 10/10

USPC .................................. 715/760, 777, 788, 789

See application file for complete search history.

(56) References Cited

U.S. PATENT DOCUMENTS

| | | | | |
|---|---|---|---|---|
| 5,799,297 | A * | 8/1998 | Goodridge et al. | 1/1 |
| 5,949,976 | A * | 9/1999 | Chappelle | 709/224 |
| 6,035,278 | A * | 3/2000 | Mansour | 705/7.19 |
| 6,519,581 | B1 * | 2/2003 | Hofmann et al. | 706/47 |
| 6,701,362 | B1 * | 3/2004 | Subramonian et al. | 709/224 |
| 7,203,909 | B1 * | 4/2007 | Horvitz et al. | 715/765 |
| 7,274,375 | B1 | 9/2007 | David | |
| 7,725,338 | B1 | 5/2010 | Wong | |
| 7,974,849 | B1 | 7/2011 | Begole et al. | |
| 2001/0019338 | A1 | 9/2001 | Roth | |
| 2002/0029272 | A1 * | 3/2002 | Weller | 709/226 |
| 2002/0078117 | A1 * | 6/2002 | Wang Baldonado et al. | 709/101 |

(Continued)

OTHER PUBLICATIONS

Mozilla,"Tab Rotator: Add-ons for Firefox;" https://addons.mozilla.org/en-US/firefox/addon/tab-rotator/, Nov. 4, 2010, 11 pages.

(Continued)

*Primary Examiner* — Eric J Bycer

(74) *Attorney, Agent, or Firm* — McDermott Will & Emery LLP

(57) ABSTRACT

Systems and methods for managing tabs, such as tabs used for accessing web pages. Such systems and methods may also provide, arrange and identify the tabs based on tasks to be performed using resources accessed via the web pages. A method for task-based web page tab management may include determining a task period. The method may also include selecting one or more tabs of a plurality of displayed tabs to adjust based on the task period and a task profile. The method may further include adjusting the display of the selected tabs. A system for task-based web page tab management may include a task period determiner and a tab adjuster. The system may also include a task profiler.

26 Claims, 11 Drawing Sheets

(56) References Cited

U.S. PATENT DOCUMENTS

| | | | | |
|---|---|---|---|---|
| 2002/0142792 | A1 | 10/2002 | Martinez | |
| 2003/0107596 | A1 | 6/2003 | Jameson | |
| 2005/0015730 | A1 | 1/2005 | Gunturi et al. | |
| 2006/0004705 | A1 * | 1/2006 | Horvitz et al. | 707/2 |
| 2006/0107219 | A1 | 5/2006 | Ahya et al. | |
| 2006/0184537 | A1 | 8/2006 | Sauve et al. | |
| 2006/0224432 | A1 | 10/2006 | Li | |
| 2006/0230356 | A1 * | 10/2006 | Sauve et al. | 715/777 |
| 2006/0271863 | A1 | 11/2006 | Cortesi | |
| 2007/0067733 | A1 * | 3/2007 | Moore et al. | 715/777 |
| 2007/0186176 | A1 | 8/2007 | Godley | |
| 2007/0266133 | A1 * | 11/2007 | Bukovec et al. | 709/223 |
| 2008/0005686 | A1 * | 1/2008 | Singh | 715/764 |
| 2008/0005693 | A1 * | 1/2008 | Oliver et al. | 715/781 |
| 2008/0133287 | A1 | 6/2008 | Slattery | |
| 2008/0155547 | A1 | 6/2008 | Weber et al. | |
| 2009/0288030 | A1 | 11/2009 | Wahl et al. | |
| 2009/0299810 | A1 | 12/2009 | Jardine et al. | |
| 2009/0327947 | A1 * | 12/2009 | Schreiner et al. | 715/777 |
| 2010/0218187 | A1 * | 8/2010 | Pasupathilingam et al. | 718/100 |
| 2010/0262653 | A1 | 10/2010 | Chaffee et al. | |
| 2010/0317371 | A1 | 12/2010 | Westerinen et al. | |
| 2011/0238736 | A1 * | 9/2011 | Tanaka | 709/203 |
| 2012/0246655 | A1 | 9/2012 | Chaar et al. | |

OTHER PUBLICATIONS

The International Search Report and Written Opinion, mailed on Jan. 25, 2013, in the related PCT Application No. PCT/US12/43516.

* cited by examiner

700

| | Trigger (704) | Frequency (706) | Task Name (708) | Application Launch Information (710) |
|---|---|---|---|---|
| 702a | 08:00 AM | Daily | Morning Routine | https://corporate.com/email/jones |
| | | | | http://www.generictimes.com/news-paper.asp/?section=sports |
| 702b | 3:00 PM | Monthly on 2nd Tuesday | Progress Report | https://corporate.com/employee.lst |
| | | | | https://corporate.com/calendar/jones |
| | | | | https://corporate.com/todolist/jones |
| 702c | 12:30 PM | Week days | Leisure Browsing | http://www.google.com/Top/Sports |
| | | | | http://www.android.com/market/ |
| | | | | http://www.google.com/talk/ |
| 702d | C:\dev\program.exe | NA | Program Development | http://developer.android.com/guide/index.html |
| | | | | http://www.javasnippets.com/examples |
| | | | | http://www.javainfo.com/styleguide.html |

| Tab Identifier | State | Application Launch Parameters |
|---|---|---|
| 0001 | Emphasized Grouped | https://corporate.com/email/jones |
| 0002 | Emphasized Grouped | http://www.generictimes.com/news-paper.asp/?section=sports |
| 0003 | Deemphasized | http://developer.android.com/guide/index.html |
| 0004 | Deemphasized | http://www.javasnippets.com/examples |
| 0005 | Hidden | http://www.popart-for-jugglers.com |

| Activity ID (904) | Time/ date Initiated (906) | Time/date Ended (908) | Action Type (910) | Activity Information (912) | Associated Activity (914) |
|---|---|---|---|---|---|
| 0001 | 12/15/2010 08:15:27 | | Building Security | Sam Smith entered building 132 | -------- |
| 0002 | 12/15/2010 08:22:31 | | Application Launch | C:\Users\Sam Smith\AppData\Local\Google\Chrome\Application\chrome.exe | NA |
| 0003 | 12/15/2010 08:23:01 | 12/15/2010 08:29:22 | Browser Window | https://corporate.com/email/ssmith | Tab select from ID 0004 |
| 0004 | 12/15/2010 08:25:01 | | Browser Window | http://www.generictimes.com/news-paper.asp/?section=sports | Tab select from ID 0003 |

FIG. 9A

| Activity ID (904) | Time/ date Spawned (906) | Time/date Ended (908) | Action Type (910) | Activity Information (912) | Associated Activity (914) |
|---|---|---|---|---|---|
| 0023 | 12/16/2010 08:06:27 | | Building Security | Sam smith entered building 132 | |
| 0024 | 12/16/2010 08:26:22 | | Appl. Launch | C:\Users\Sam Smith\AppData\Local\Google\Chrome\Application\chrome.exe | NA |
| 0025 | 12/16/2010 08:29:15 | | Browser | http://www.generictimes.com/news-paper.asp/?section=sports | Tab select from 0025 |
| 0026 | 12/16/2010 08:31:15 | | Browser | https://corporate.com/email/ssmith | Tab select from 0025 |
| 0031 | 12/16/2010 14:00:17 | 12/16/2010 15:03:45 | Browser | http://www.javainfo.com/styleguide.html | Tab select from 0028<br>Tab select from 0030 |

FIG. 9B 904 906 908 910 912 914

| Activity ID | Time/ date Initiated | Time/date Ended | Action Type | Activity Information | Associated Activity |
|---|---|---|---|---|---|
| 0027 | 12/16/2010 11:30:18 | 12/16/2010 15:10:17 | Appl. Launch | C:\dev\program.exe | |
| 0028 | 12/16/2010 11:45:16 | 12/16/2010 15:01:22 | Browser | http://developer.android.com/guide/index.html | Tab select from 0030<br>Tab select from 0031 |
| 0029 | 12/16/2010 13:17:22 | 12/16/2010 15:45:22 | Appl. Launch | C:\dev\debugger.exe | |
| 0030 | 12/16/2010 13:32:21 | 12/16/2010 15:03:11 | Browser | http://www.javasnippets.com/examples | Tab select from 0028<br>Tab select from 0031 |
| 0031 | 12/16/2010 14:00:17 | 12/16/2010 15:03:45 | Browser | http://www.javainfo.com/styleguide.html | Tab select from 0028<br>Tab select from 0030 |

FIG. 9C

TEMPORAL TASK-BASED TAB MANAGEMENT

CROSS REFERENCE TO RELATED APPLICATIONS

This application is a continuation of U.S. application Ser. No. 13/165,583, filed Jun. 21, 2011, which is hereby incorporated by reference in its entirety.

BACKGROUND

1. Technical Field

Embodiments relate generally to client server applications.

2. Background

A web browser is a software application executed on a computing device that allows a user to view or download content that is available on a network, such as on a website on the World Wide Web. Content may include text, files, images, audio, video and personal communications. A browser may also allow a user to enter, upload, or execute content. Browsers may use a number of protocols and standards to obtain or manage content flow. Most browsers primarily use hypertext transfer protocol (HTTP) to fetch content and web pages.

Web browsers may be used to display news and sports information, weather information, on line forums (e.g., social and business networking forums, web blogs, bulletin boards, and online discussion forums), online shopping sites, and specialized and general purpose web search sites. Web browsers have been used to provide web based applications such as tax preparation software, office software (e.g., software for preparing documents, presentations, spread sheets, and databases), and game playing applications.

Web browser clients that support tabbed browsing are becoming increasing popular. Tabbed web browsers allow a user to open multiple browser windows, each having a corresponding tab for selecting the window. The tabs may be arranged in a tab area of the web browser client. Typically, the tabs occupy a substantially smaller area of the browser than the browser windows. The small space occupied by the tabs allows a large number of tabbed windows to be opened at one time without exhausting the space reserved for the tabs or largely reducing the space for displaying an active browser window.

Users can efficiently switch between applications by selecting browser tabs. As the number of tabs increases, the effort required to locate and select the proper browser tab decreases the user's efficiency.

BRIEF SUMMARY

Embodiments for managing the tabs for multiple windows on a client based on a user task are provided. Such a capability may also provide for organizing and displaying sets of tabs.

In an embodiment, a method for task-based web page tab management may include determining a task period. The method may also include selecting one or more tabs of a plurality of displayed tabs to adjust based on the task period and a task profile. The method may further include adjusting the display of the selected tabs.

In another embodiment, a system for task-based web page tab management may include a task period determiner configured to determine a task period. The system may also include a tab adjuster configured to select one or more tabs of a plurality of displayed tabs to adjust based on the task period and a task profile, and to adjust the display of the selected tabs.

In an embodiment, a method for task-based web page tab management is provided. The method may include determining a task period. The method may also include selecting a first set of one or more tabs of a plurality of displayed tabs to adjust based on the task period and a task profile. The method may further include selecting a second set of one or more tabs of the plurality of displayed tabs to adjust based on the task period. The method may also include adjusting the display of the first and second sets of selected tabs. The first set of tabs may be adjusted in a first manner and the second set of tabs is adjusted in a second manner.

In another embodiment, a system for task-based web page tab management may include a task period determiner configured to determine a task period. The system may also include a tab adjuster configured to select a first set of one or more tabs of a plurality of displayed tabs to adjust based on the task period and a task profile and select a second set of one or more tabs of the plurality of displayed tabs to adjust based on the task period. The tab adjuster may also be configured to adjust the display of the first and second sets of selected tabs. The first set of tabs may be adjusted in a first manner and the second set of tabs is adjusted in a second manner.

BRIEF DESCRIPTION OF THE DRAWINGS

Embodiments are described, by way of example only, with reference to the accompanying drawings. In the drawings, like reference numbers may indicate identical or functionally similar elements. The drawing in which an element first appears is typically indicated by the leftmost digit or digits in the corresponding reference number.

FIGS. 7 and 8 illustrate data structures suitable for practicing embodiments.

FIGS. 9A, 9B, and 9C illustrate a data structure suitable for practicing an embodiment.

DETAILED DESCRIPTION

Figure 1:
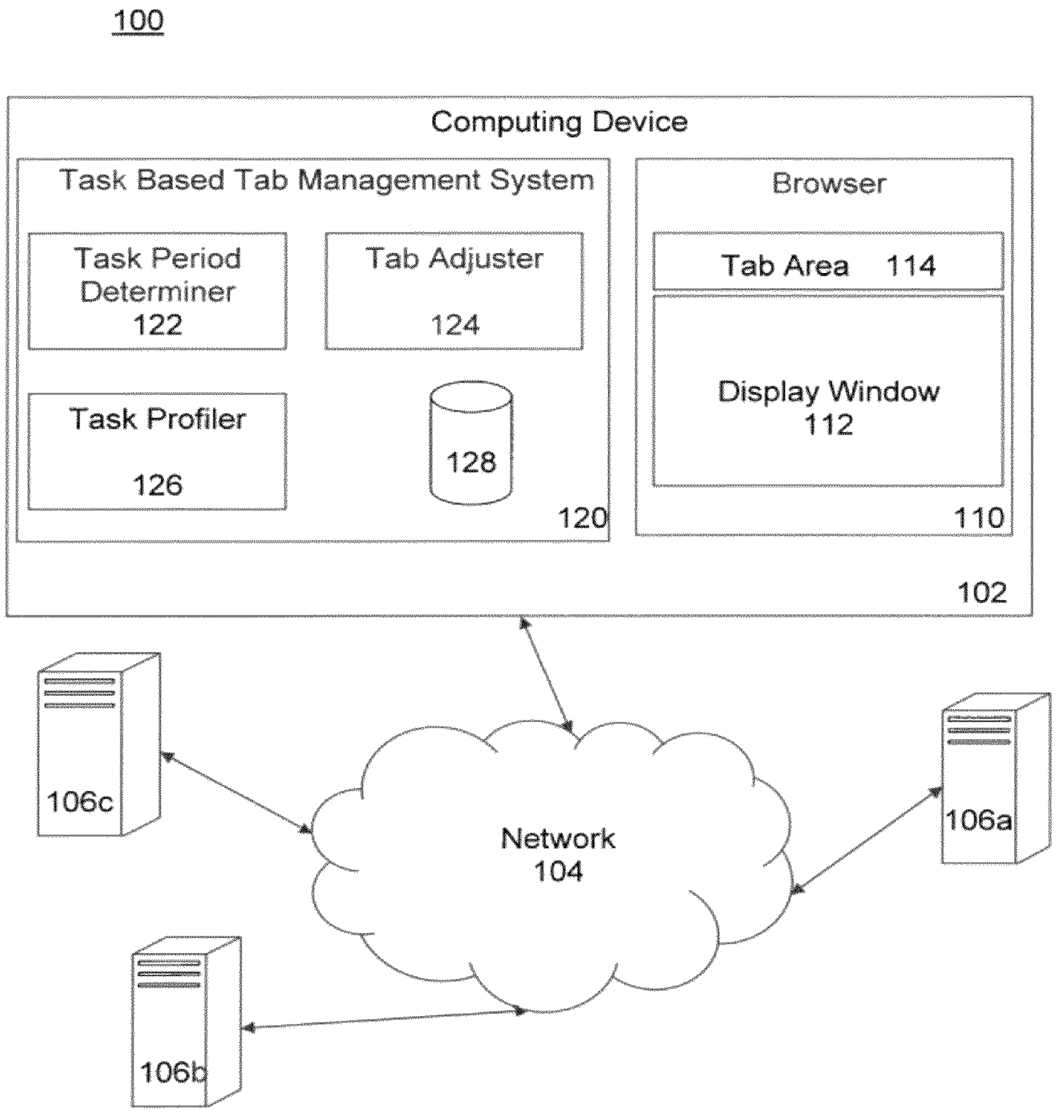
FIG. 1 is a diagram of an exemplary communication system suitable for practicing an embodiment.

Embodiments relate to managing tabs for accessing server applications on a client. Embodiments manage sets of tabs associated with tasks to facilitate accessing a relevant set of tabs during a task period. Embodiments may also emphasize a relevant set of tabs and deemphasize one or more other sets of tabs.

A user might begin his activity at a computer by checking his email, and viewing online news using a browser client for accessing web based services. Embodiments may identify a task period corresponding to the start of the user's morning activities, and may open browser windows associated with an email reader and an online news site favored by the user. Tabs for the open browser windows may be adjusted to emphasize the tabs for the user during the identified task period.

In another example, a user may start up a programming editor at the start of a software development task period. Embodiments may detect the start up of the programming editor and may emphasize tabs on the user's browser associated with programming resources that the user typically consults when engaged in software development. Tabs that are not associated with the software development task may be deemphasized on the user's browser.

Embodiments are described herein with reference to illustrations. It should be understood that the invention is not limited to the embodiments. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

For example, in the embodiments described below, the client applications are Hypertext Markup Language (HTML) compatible tabbed browsers. The use of such browsers is exemplary, and other clients or applications that are capable of displaying tabbed windows providing access to multiple server applications or functions can be used.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIG. 1 is a diagram of a system 100 for task-based web page tab management, according to an embodiment. Exemplary system 100 includes computing device 102, network 104, and web servers 106*a*, 106*b*, and 106*c*. Web servers 106*a*, 106*b*, and 106*c* are server systems that include one or more computers that host web based applications. Although only three servers 106*a*, 106*b*, and 106*c* are shown in FIG. 1, more or fewer servers may be used as appropriate. In other cases, 106*a*, 106*b* and 106*c* may also be other client or mobile devices.

Network 104 connects web servers 106*a* and 106*b* to computing device 102. Network 104 can be any network or combination of networks that can carry data communications. Such a network can include, but is not limited to, a wired (e.g., Ethernet) or a wireless (e.g., Wi-Fi and 3G) network. In addition, network 104 can include, but is not limited to, a local area network, medium area network, and/or wide area network such as the Internet. Network 104 can support protocols and technology including, but not limited to, Internet or World Wide Web protocols and/or services. Intermediate network routers, gateways, or servers may be provided between components of system 100 depending upon a particular application or environment.

Computing device 102 is configured to execute instructions and to carry out operations associated with system 100. In an embodiment, computing device 102 can be implemented on a single computing device such as, for example and without limitation, a stand-alone device. Computing device 102 can be based on processing devices that include, but are not limited to, programmable logic arrays, application-specific integrated circuits, and central processing units that have at least one processor and memory. In another embodiment, computing device 102 can have multiple processors and multiple shared or separate memory components such as, for example and without limitation, one or more computing devices incorporated in a clustered computing environment or a server farm. The computing process can be performed by the clustered computing environment, or server farm, and may be carried out across multiple processors located at the same or different locations.

Computing device 102 includes a display device for presenting text and graphical information. The display device can be, for example and without limitation, a liquid crystal display, a plasma display, a computer monitor (e.g., a variable graphics array (VGA) display, a super VGA display, and a cathode ray tube display), and other similar types of display devices. In an embodiment, the display device can be configured to display a graphical user interface (GUI) that provides an interface between a user and computing device 102 or an application running on computing device 102 (also referred to herein as a "system application"). The system application can be, for example and without limitation, an email application, a multi-media display application, a document generating application, or a video game. Features of the GUI for the system application can be arranged in a predefined layout on the display device or can be generated dynamically to serve specific actions taken by the user, according to an embodiment. For instance, the GUI can display information such as interactive text and graphics for the user to select via an input device.

Computing device 102 can be, for example, and without limitation, a personal computer system (e.g., desktop, laptop, tablet, and handheld computers), a personal digital assistant (PDA), mobile device, navigation device or a smart phone. Computing device 102 is configured to access content hosted on web servers 106*a*, and 106*b* over network 104. Computing device 102 hosts browser 110 and task based tab management system 120. Browser 110 may exist within or be executed by hardware in computing device 102. For example, browser 110 may be software, firmware, or hardware or any combination thereof in computing device 102.

Browser 110 includes window area 112 for displaying visual content in a window from one or more selected web based application, and tab area 114 for displaying tabs associated with open browser windows associated with web based applications. A user can select a window from a set of open windows for viewing in window area 112 by selecting a tab associated with the window and displayed in tab area 114 using an input device connected to or a touch screen on computing device 102. For example, a user might use a pointing device connected to computing device 102 to select a particular tab, and in response to the selection, browser 110 may be configured to display the contents of a window associated with the selected tab in window area 112.

According to an embodiment, task based tab management system 120 includes task period determiner 122, task profiler 126, and tab adjuster 124. Task period determiner 122 may determine the relevant tasks to be performed on computing device 102 at the current time. Task profiler 126 may track user activity on computing device 102 and track the tasks and activities initiated on computing device 102 to generate a task profile. Tab adjuster 124 may control one or more features of sets of tabs, including, for example, the appearance, location, and grouping of tabs based on a task profile. System 100 may also include task database 128. Task database 128 may store the task profile and other data generated and used by components of task based tab management system 120.

Figure 3:
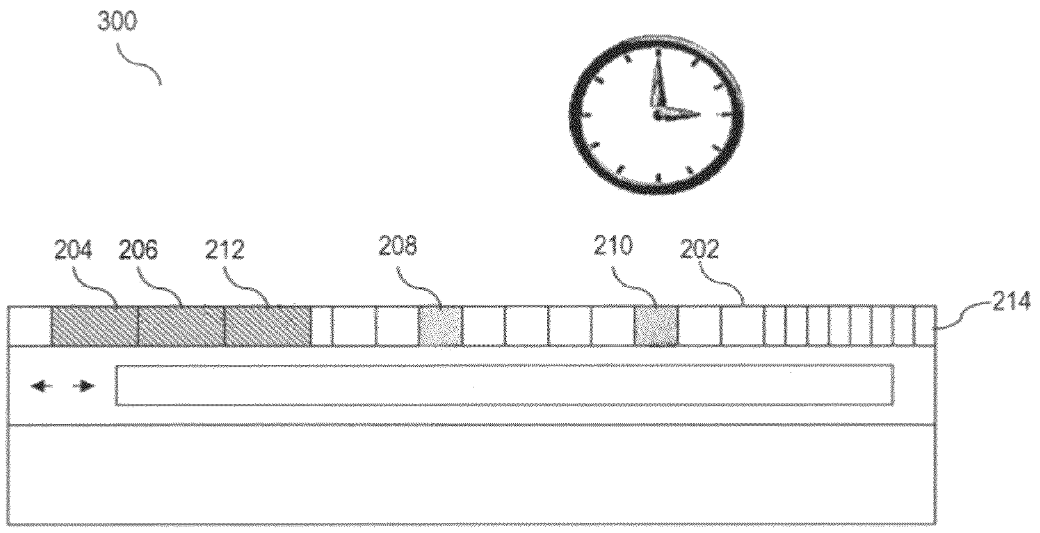
Figure 4:
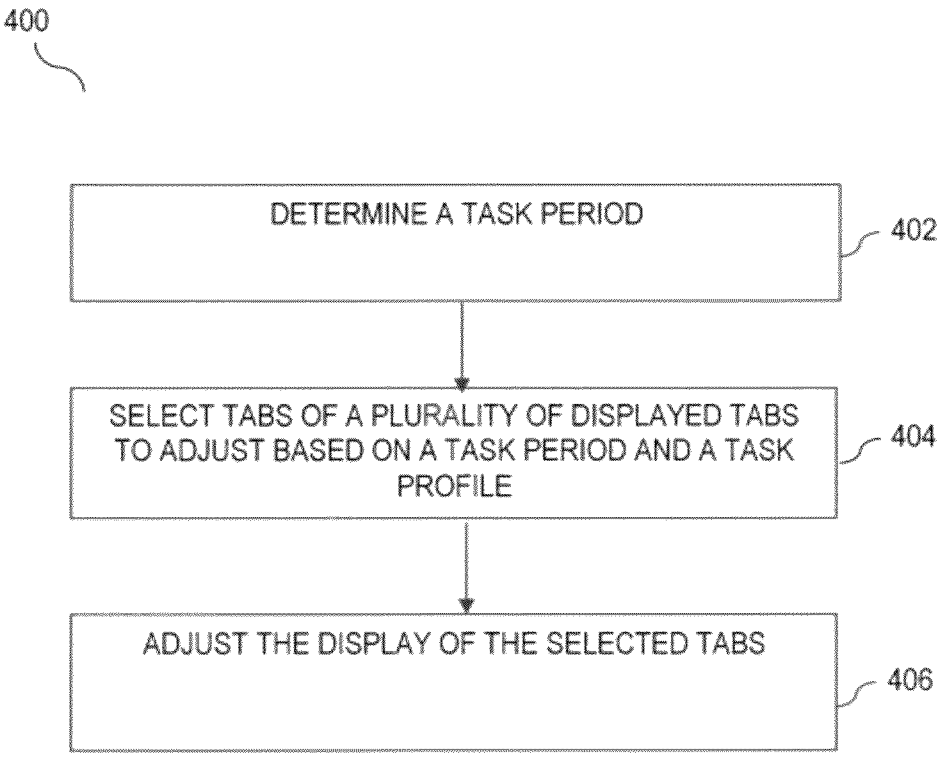
FIG. 4 is a flow chart illustrating a method in accordance with an embodiment.

FIG. 4 is a flow chart illustrating an exemplary method 400 of an embodiment. For ease of explanation, method 400 will be described with respect to system 100 of FIG. 1 and the tab systems shown in FIGS. 2 and 3. However, it is noted that embodiments of the method are not intended to be limited thereto.

Method 400 begins in step 402 with determining a task period. In an embodiment, task period determiner 122 may be configured to identify a task period by comparing the current time to a stored task profile and determine if a time associated with a task or a set of tasks has been reached. In some embodiments, current activity of a user or application can be compared to a task profile.

FIG. 7 shows an example data structure that represents data stored in one or more tables in task database 128 in an embodiment. Data structure 700 includes multiple records with each record representing information for one or more tabbed windows that can be opened in browser 110. In the illustrated example, records 702*a* through 702*d* of data structure 700 each include information defining a respective set of tabs that are to be adjusted based on identified time periods. Fields 704 and 706 of data structure 700 include information describing a triggering events for each a set of tabs.

Example record 702*a* of data structure 700 contains information for a set of two tabs associated with the task period "Morning Routine" that are adjusted daily at 08:00 AM. Example record 702*b*, of data structure 700 contains information for a set of three tabs associated with task period "Progress Report" that are to be adjusted monthly on the second Tuesday of each month at 3:00 PM. Example record 702*c* of data structure 700 contains information for a set of three tabs associated with task period "Leisure Browsing" that are adjusted every weekday at 12:30 PM.

For records 702*a*-702*d* of data structure 700, field 708 includes a task reference or a descriptive task period name associated with each set of tabs, and field 710 includes application launch information for accessing a web based application via browser 110. In the illustrated example, the application launch information includes a Uniform Resource Locator (URL) associated with a web application window and the corresponding tab. The URL identifies the location of a web based resource to be accessed from browser 110. In an embodiment, the application launch information may include a path to access a web application and parameters be passed to the web application. For example in record 702*a* the URL in field 710 includes a domain name "http://www.generictimes.com/" indicating the location of a web server system hosting a web, a path to a resource, namely application script "news-paper.asp", and a query string "section=sports" that specifies that a parameter "section" having a value of "sports" to be passed to the web application. The identified web server returns application output from the identified application to computing device 102, which displays the output in a browser window associated with the second tab of the 8:00 daily tab set.

In an embodiment, task period determiner 122 can be configured to compare the current time with the time periods specified in specified in field 704 for each set of tabs described in 700 and to generate an output identifying a task identifier (e.g., the descriptive task name) for a set of tabs when the current time corresponds to one of the specified time periods. In a further embodiment, task period determiner 122 can be configured to identify a task period by identifying one or more task trigger actions and determining if the one or more trigger action associated with the task period has occurred.

Referring again to data structure 700 in FIG. 7, record 702*d* represents a set of three tabs that are triggered when the action in field 704 is identified. In the illustrated example, the trigger action for the set of tabs associated with record 702*d* is a launch of application "program.exe" (i.e., the executable for the program) on computing device 102. Field 708 indicates that the descriptive name for the task period associated with the set of tabs is "Program Development" and field 710 of each record associated with the tab set includes the URLs for launching web based applications for opening windows associated with the tab set. In the illustrated example, tabs for windows associated with programming resources (e.g., Android™ SDK information, Java™ code examples, and a Java™ style guide) are identified as tabs to be adjusted when the program.exe programming IDE is launched on computing device 102.

In the illustrated example, a single triggering event is associated with a set of tabs. In a further embodiment, field 704 may include multiple trigger actions, and task period determiner 122 can be configured to identify a task period in response to detecting one, all, or any number of the triggering events included in field 704.

In an embodiment, task period determiner 122 can be configured to detect actions performed on computing device 102 and to identify the detected actions as candidate actions for adjusting a set of tabs. In an embodiment, task period determiner 122 can be configured to identify the startup of application programs on computing device 102 by monitoring a program launcher or a process table maintained by an operating system executing on computing device 102. In another example, task period determiner 122 can monitor email activity to identify the sending or receiving of emails having identifying features (e.g., a specified subject line, to or from address or body content). In a further example, task period determiner can monitor the selecting of one or more tabs on browser 110 as candidate trigger actions for adjusting a set of tabs.

In a further embodiment, task period determiner 122 can receive indications of activity from systems external to computing device 102 and generating reports receivable by computing device 102. For example task period determiner 122 can be configured to identify receiving a report from a facility security system that a user of computing device 102 has left or entered the facility as a candidate action for triggering an adjustment of tabs. As a further example, task period determiner 122 can be configured to identify receipt of a signal from an emergency warning system of inclement indicating inclement weather as a candidate activity for adjusting a set of tabs.

One of ordinary skill in the art will understand based on the information herein, that task period determiner 122 can be configured to identify a variety of activities initiated by a variety of systems as candidate actions for triggering an adjustment of tabs.

In an embodiment, task period determiner 122 can be configured to compare one or more actions detected on computing device 102 with the trigger actions specified in field 704 for each set of tabs described in 700 and can be further configured to generate an output identifying a task period (e.g., by specifying the descriptive task name) having trigger action or actions that corresponds to the actions detected on computing device 102.

In the above description, URLs are used as application launch information. One of ordinary skill in the relevant arts based on the information herein will understand that embodiments may use various methods to specify application launch information. For example, computing device 102 can use a different remote procedure call technique. For example extensible markup language remote procedure (XML-RPC) requests can be used to access applications on a web server, and the application launch information can include the XML information for making the remote procedure call for a particular application.

Method 400 continues in step 404 with selecting tabs of a plurality of displayed tabs to adjust based on the task period and a task profile. In an embodiment, tab adjuster 124 may select a set of tabs of a plurality of displayed tabs to adjust based on the task period identified by task period determiner 122 and a task profile retrieved from task database 128.

Referring again to FIG. 7, data structure 700 includes a task profile for a user of computing device 102. Tab adjuster 124 may be configured to retrieve data structure 700 from task database 128 and to identify a candidate set of tabs and respective application launch information corresponding to the task period identified by task period determiner 122. Tab adjuster 124 may be further configured to select a set of tabs on browser 110 that were launched with application launch information corresponding to the application launch information for the identified candidate tabs.

Referring now to FIG. 8, data structure 800 represents information stored in one or more tables in task database 128 in an embodiment. Each record of data structure 800 corresponds to a tab available on browser 110. Field 804 of each record contains an identifier for a respective tab. Field 806 includes information indicating the display state (e.g., information describing a tabs appearance and/or location on browser 110) of a respective tab, and field 808 contains information describing the application launch information used to open the window associated with the respective tab.

In an embodiment, tab adjuster 124 can be configured to select tabs for which the application launch information in data structure 800 corresponds to the application launch information of a tab of the identified candidate set of tabs. For example, at time 8:30 AM, task period determiner 122 can identify task period "Morning Routine" as the current task period based on information in data structure 700. Tab adjuster 124 can identify URLs "https://corporate.com/email/jones" and "http://www.generictimes.com/news-paper.asp/?section=sports" as application launch information for a candidate set of tabs for adjusting based on the identified task period and the profile information in data structure 700. Tab adjuster 124 can the select browser tabs with identifiers 0001 and 0002 for adjustment based on information for tabs presented on browser 110 included in data structure 800.

In an embodiment, selecting the task to display can include spawning a new window and an associated tab on browser 110. Tab adjuster 124 may be configured to spawn a new task window with associated tab in browser 110, when a tab of a candidate set of tabs identified by tab adjuster 124 has associated application launch information that does not correspond to application launch information for a tab presented on browser 110. In a further embodiment, tab adjuster 124 may be configured to launch browser 110 if browser 110 is not currently active on computing device 102.

For example, task period determiner 122 may identify task period "Program Development" as the current task period in response to detecting the launching of the Programming IDE, based on information in data structure 700. Tab adjuster 124 can identify URLs "http://developer.android.comlguide/index.html", "http://www.javasnippets.com/examples", and "http://www.javainfo.com/styleguide.html" as application launch information for a candidate set tabs for adjusting based on the task period and the profile information using the methods described above. Tab adjuster 124 may select browser tabs with identifiers 0003 and 0004 presented on browser 110 for adjustment based on information for tabs presented on browser 110 included in data structure 800. In the illustrated example, data structure 800 does not include information corresponding to a tab having application launch information for accessing the Java™ style guide, namely "http://www.javainfo.comlstyleguide.html", because a corresponding window and tab are not presently available on browser 110. Tab adjuster 124 can be configured to open a browser window and tab on browser 110 for the Java™ style guide using the corresponding application launch information in data structure 700, and can be further configured to select the newly opened tab for adjusting.

In a further embodiment, task period determiner 122 can be configured to open new tabs based on application launch information in data structure 700 regardless of the presence of a corresponding tab opened on browser 110 and to select the newly opened tabs for adjusting.

Method 400 continues in step 406 with adjusting the selected tabs on the display. In an embodiment, tab adjuster 124 can be configured to adjust the set of tabs selected in step 404. Various methods for changing the appearance and location of the tabs in the selected set of tabs. Example methods for adjusting a set of tabs will be described with reference to FIGS. 1, 2, 3, and 4.

Figure 2:
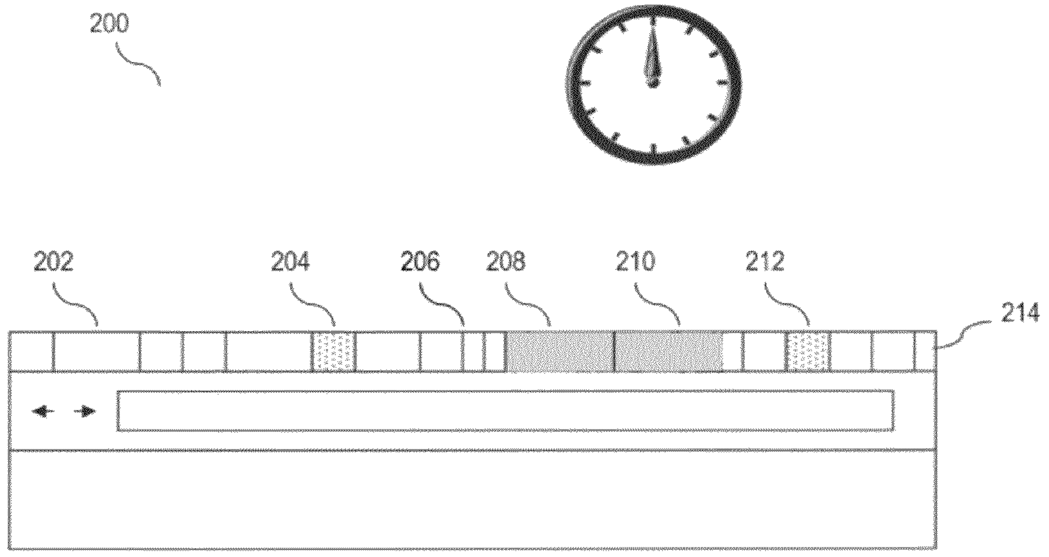
FIGS. 2 and 3 are diagrams that schematically illustrate a browser with tabs suitable for practicing an embodiment.

FIGS. 2 and 3 illustrates tabs in an example tabbed browser 200 according to an embodiment. Tabbed browser 200 is managed by the tasked based tab management system shown in FIG. 1. FIG. 2 shows several tabs on browser 200 at time 12:00. In the illustrated example, time 12:00 corresponds to a previous task period in which tabs 208 and 210 were adjusted. Browser tab 202 is located at the far left of tab area 214 and is a wide tab, browser tabs 204, 206, and 212 are narrow tabs located at various positions in tab area 214 and are narrow tabs. Browser tabs 208 and 210 are clustered together and are wide tabs having a color different from the other tabs in tab area 214.

FIG. 3 illustrates the tabs on browser 200 at time 3:00 PM. At 3:00 PM, task period determiner 122 of task based tab management system 120 identifies that task period "Progress Report" is active and tab adjuster 124 selects tabs 204, 206, and 212 of browser 200 as tabs to be adjusted using the methods described above with reference to FIG. 4.

In an embodiment, tab adjuster 124 can be configured to adjust the selected tabs by clustering the selected tabs. For example, tab adjuster 124 can be configured to move tabs 204, 206, and 212 from their previous positions in which the tabs were arranged along the length of tab area 214 as shown in FIG. 2, to a position as shown in FIG. 3, where the selected set of browser tabs 204, 206, and 212 are arranged in a cluster at the far left of tab area 214.

In an embodiment, tab adjuster 124 can be configured to adjust the selected tabs by changing the width of the selected tabs. For example, as shown in FIG. 3, tab adjuster 124 can be configured to set the width of tabs 204, 206, and 212 to be greater than that of all of the tabs that were not selected by tab adjuster 124.

In an embodiment, tab adjuster 124 can be configured to adjust the selected tabs by changing the color of the selected tabs. For example, as shown in FIG. 3, tab adjuster 124 has set tabs 204, 206, and 212 to a color distinct from a color of the tabs that were not selected by tab adjuster 124. In the illustrated example tabs 204, 206, 212 have been set to a shade of grey distinct from the grey and white of the remaining tabs, but the selected tabs can be changed using any colors and/or shading that distinguishes the tabs from the remaining tabs.

One of skill in the relevant art will understand based on the description herein that a variety of methods can be used to adjust the selected set of tabs to distinguish them from non selected tabs. For example, tab adjuster 124 may be configured to move the selected set of tabs to a second tab area located in a different area of the browser than tab area 214. As another example, tab adjuster 124 can be configured to adjust the selected set of tabs to a different shape than the remaining tabs. As a further example, adjusting the selected tabs may include making visible to the user any tabs of the selected set of tabs are hidden. Tabs may also become animated.

In an embodiment, multiple methods for adjusting tabs may be combined and applied to a set of selected tabs. For example, in FIG. 3, tab adjuster 124 has adjusted tabs 204, 206, and 212, by applying clustering, width adjusting, and color adjusting, and relocating to tabs 204, 206, and 212.

Tab adjuster 124 may be configured to perform the adjustments of sets of tabs in a manner that emphasizes or draws the user's attention to the tabs being adjusted. For example, tab adjuster 124 may be configured to perform clustering or moving of a set of tabs by showing an animation of the tabs in the selected set moving to their clustered or new locations, changing to a new color or changing to a new width. In another example, tab adjuster 124 may cause a selected set of tabs to flash for a predetermined period by intermittently changing the color of the selected set of tabs to a different color and restoring the color of the set of tabs.

Figure 5:
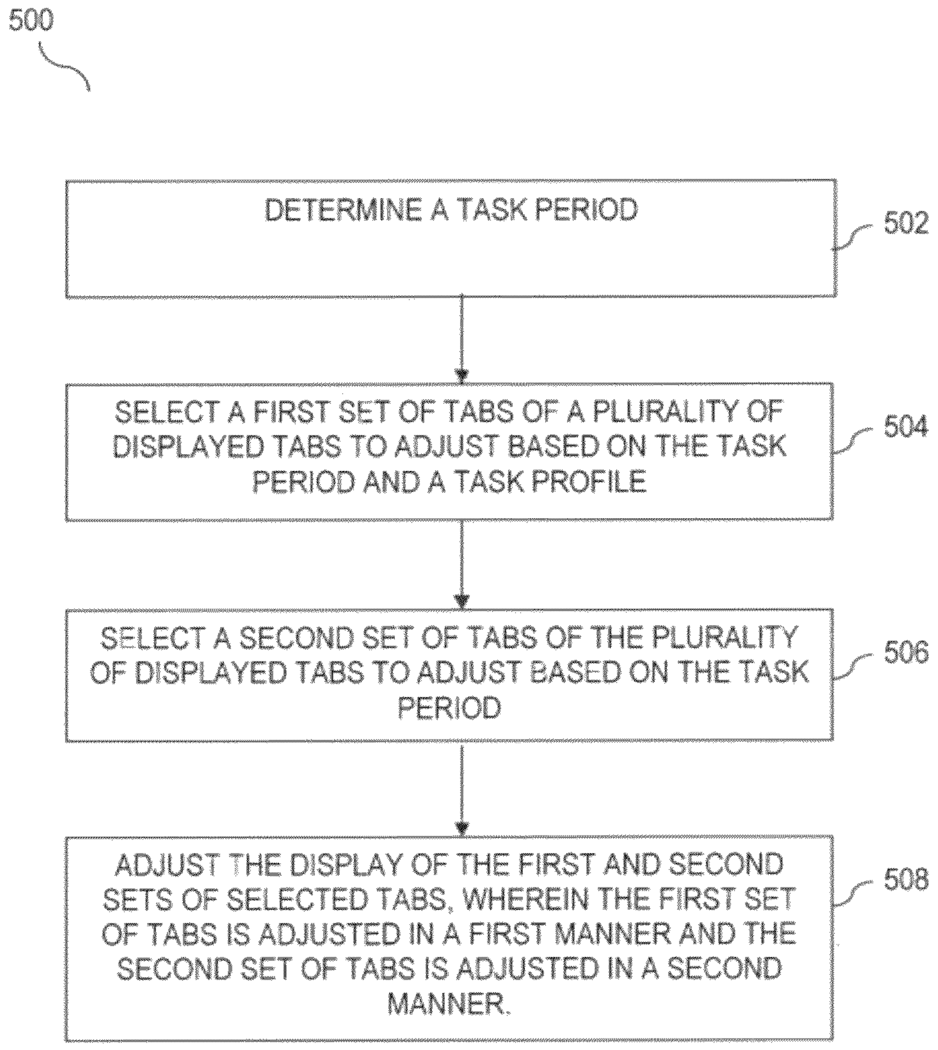
FIG. 5 is a flow chart illustrating another method in accordance with an embodiment.

FIG. 5 is a flow chart illustrating an exemplary method 500 of an embodiment. For ease of explanation, method 500 will be described with respect to system 100 of FIG. 1 and the tab systems shown in FIGS. 2 and 3. However, it is noted that embodiments of the method are not intended to be limited thereto.

Method 500 begins in step 502 with determining a task period. In an embodiment, task period determiner 122 may be configured to identify a task period using methods similar to those described above with reference to step 402 of method 400. Method 500 continues in step 504 with selecting a first set of tabs of a plurality of displayed tabs to adjust based on the task period and a task profile.

In an embodiment of tab adjuster 124 may select a first set of tabs of a plurality of displayed tabs to adjust using methods similar to those methods used to select a set of tabs described above with reference to step 404 of method 400.

Method 500 continues in step 506 with selecting a second set of tabs of a plurality of displayed tabs to adjust based on the task period. In an embodiment, tab adjuster 124 may be configured to select all of the remaining tabs presented on browser 110 that do not correspond to the tabs in the task period selected by task period determiner 122 as a second set of tabs. For example, tab adjuster 124 may be configured to identity all the presented tabs based on presented tab information stored in data structure 800 shown in FIG. 7, and to identify select as the second set of tabs, all tabs in data structure 800 that do not correspond to tabs in the first selected set based on the time period.

In another embodiment, tab adjuster 124 may be configured to select the tabs associated with a previously determined task period as the second set of tabs. For example, tab adjuster 124 can be configured to identify the tabs selected for a previous task period based on information in tab state data structure 800.

In another embodiment, tab adjuster 124 can be configured to select the tabs associated with an upcoming task period as the second set of tabs. For example, determiner 122 can be configured to identify an upcoming task period based on information in the data structure 800, and tab adjuster 124 can be configured to select the tabs corresponding to the upcoming task period as a second set of tabs.

In another embodiment, task period determiner 122 can determine a second task period based on detecting a newly received trigger corresponding to a second task period based on methods similar to those described above in step 402 of method 400 and tab adjuster 124 can be configured to select a second set of tabs that corresponds to the second task period. One of skill in the relevant art will understand based on the description herein that there are various ways of selecting a second set of tabs for adjusting.

Method 500 continues in step 508 with adjusting the display of the first and second tabs wherein the first set is adjusted in a second manner and the second set of tabs is adjusted in a second manner. For example, tab adjuster 124 may adjust the first set of tabs in a first manner using methods similar to those described above with reference to step 406 of method 400. Tab adjuster 124 may be configured to adjust the second set of tabs in a variety of manners.

In an embodiment, tab adjuster 124 can be configured to adjust the second set of tabs by adjusting one or more of the width, color, location, appearance of the second set of tabs. In FIG. 2, tabs 204, 206, and 212 are a first set of tabs, and tabs 208 and 210 are a second set of tabs. In FIG. 3, the first set of tabs has been adjusted in a first manner by changing the color of the tabs to a common color, increasing the width of the tabs, and clustering the first set of tabs at the left of tab area 214. The second set of tabs has been adjusted in a second manner by moving the tabs away from the area of the first set of tabs, reducing the width of tabs in the second set to be smaller than the width of the first set of tabs, changing the color of tabs 208 and 210 to a color distinct from the first set of tabs, and un-clustering the tabs of the second set.

In a further embodiment, adjusting the tabs of the second set may include hiding the tabs of the second set so that the second set of tabs are not visible to a user, while adjusting the tabs of the first set may include making visible to the user any tabs of the first set that are hidden.

One of skill in the relevant arts will appreciate that the tasks of the first and second sets can be adjusted in various manners. In an exemplary embodiment, the tabs of the first set can be adjusted by clustering tabs in one tab area, while the second set of tabs can be clustered in a second area distinct from the first area. In another embodiment, the tabs of the second set can be clustered adjacent to the tabs of the first set. In a further embodiment, the tabs of the second set can be adjusted to be colored differently and/or to have different widths from tabs of the first set and from tabs presented on browser 200 that are in neither the first or the second set.

Figure 6:
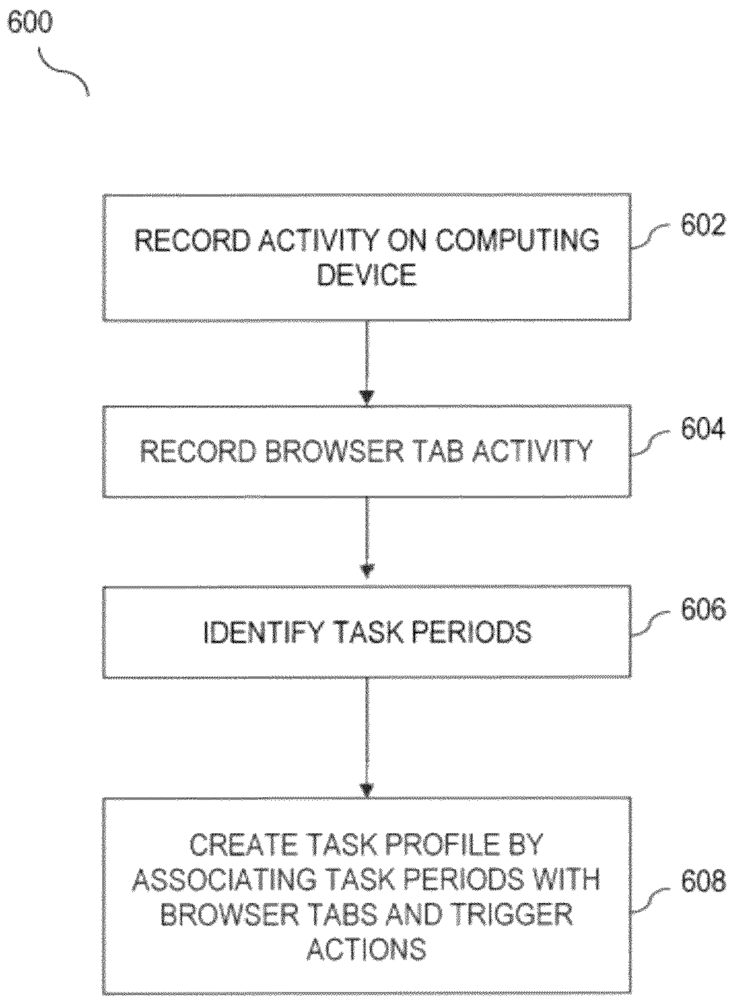
FIG. 6 is a flow chart illustrating yet another method in accordance with an embodiment.

FIG. 6 is a flow chart illustrating an exemplary method 600 for creating a task profile in an embodiment. Method 600 will be described with respect to system 100 of FIG. 1 and the tab systems shown in FIGS. 2 and 3. However, it is noted that embodiments of the method are not intended to be limited thereto.

Method 600 begins in step 602 with recording trigger actions detected on a computing device. In an embodiment, task profiler 126 may identify activities on computing device 102 and record information associated with the identified activities in task database 128. The recorded activities may be candidate trigger actions for a task profile to be created. The identified activities may include actions such as user behavior (e.g., launching of applications, focused tab windows), automated events performed on computing device 102, and notification of activities performed elsewhere and received by computing device 102. In an embodiment, task profiler 126 may identify activities of computing device 102 using methods similar to those described as being performed by task period determiner 122 in method 400 described above.

Data structure 900 illustrated in FIGS. 9A, 9B, and 9C is an example data structure that can represent one or more tables stored in database 128 for recording activities by task profiler 126. FIGS. 9A, 9B, and 9C show example activities identified and recorded during a period spanning Dec. 15, 2010 and Dec. 16, 2010 by an embodiment of task profiler 126. Each record of example data structure 900 contains information corresponding to an identified activity. In example data structure 900, field 904 contains a unique activity ID for each identified activity. Fields 906 and 908 contain the starting and ending time for an identified activity. Field 910 contains a description of the type of activity identified, and field 912 includes information related to the identified activity. Example field 914 contains a description of related actions performed in associated with the respective activity.

Referring to FIG. 9A, for the record for the identified activity with ID 0001, data structure 900 indicates that the activity is a building security notification indicating that Sam Smith has entered building 132. The record of data structure 900 for the identified activity with ID 0002 represents the startup of a browser on computing device 120.

Method 600 continues in step 604 with recording browser tab activity. In an embodiment, task profiler 126 can be configured to monitor activity on browser 110 and to identify activities on browser 110 computing device 102 and to record information associated with the identified browser activities in task database 128. Task profiler 126 can be configured to record the activity in data structure 900. Referring again to FIG. 9A, for the record for the identified activity with ID 0003, data structure 900 indicates that the respective activity is opening of a browser window on browser 110 on computing device 102. The record of data structure 900 for the identified activity with ID 0004 indicates that the respective activity is opening of a second browser window on browser 110 on computing device 102. Fields 914 of the two records describe browser activity of tabbing between the two open browser windows.

Method 600 continues in step 606 with identifying task periods. In an embodiment, task profiler 126 can be configured to retrieve stored information related to activities on computing device 102 and to identify task periods based on the stored information and to generate a task profile.

In an embodiment, various methods for identifying task periods may be used. For example, task profiler 126 can be configured to identify activities occurring within a predetermined period prior to browser activities as candidate task periods. For example, task profiler 126 can be configured to identify that the building security activity (ID 0001) and the browser launch activity (ID 0002) both occur within a short time (e.g., less than 10 minutes) of opening a browser window (ID 0003). In an embodiment, task profiler 126 can identify the browser launch activity and the building security activity as candidate tasks to trigger a task period.

In an embodiment, task profiler 126 can be configured to recognize the time of day as a candidate task period. For example, task profiler 126 can be configured to identify the time of a candidate task as a candidate trigger. For example, task profiler 126 may identify the time of occurrence of the building security activity and the browser launch activity at 8:15 am and 8:22 am as candidate tasks to trigger a task period.

In an embodiment, task profiler 126 can be configured to recognize activity associated with tabs as identifying a task period. A task period can be defined by a change in the content of a web page associated with a tab. Task profiler 126 can be configured to identify a change in the URL for a window, or a change in the text displayed in a window as indicating a change as identifying a task period.

One of skill in the relevant arts will understand based on the description herein, that various events may be detected and recorded by task profiler 126, and then used to identify a task period. For example, task profiler 126 can be configured to detect that spawning of a window and associated new tab from an existing browser window as identifying a task period. In an other example, task profiler 126 can be configured to identify a changing the focus to a new tab as an event signaling a task period.

In an embodiment, task period determiner 122 may be configured to detect any event specified as a trigger in a task profile by task profiler 126. For example, task period determiner 122 can be configured to recognize activity associated with tabs such as changes in content of a web page associated with a tab, spawning of a tab and associated window, and a change in a focus on a tab as events identifying a task period.

In an embodiment, task profiler 126 can be configured to identify candidate repetition periods for task periods of the profile by identifying repeated occurrences of an identified activity. Referring now to FIG. 9B, a building security report that Sam entered building 132 and the launch of browser are repeated as activities 0023 and 0024 one day after similar task 0001 and 0002 were identified. Task profiler 126 may be configured to identify a candidate repetition period of "daily" for time of day task periods associated with the building security report and browser launch.

In an embodiment, task profiler 126 can be configured to display information related to candidate task periods in a user interface displayed on computing device 102 and to receive user input via the user interface that one or more candidate activities as signals for a task periods. In a further embodiment, a user may specify additional information related to a task period such as a descriptive task name, and a repetition period (e.g. daily, weekly, on weekdays, or monthly) through a user interface provided on the display of computing device 102. For example, a user may reject the building security and the browser launch activities shown in FIG. 9A as task period triggers, and identify time of day (e.g. 8:15) as indicating a task period for adjusting tabs. In an embodiment, a user may identify multiple candidate tasks as triggers for a task period.

Method 600 continues in step 608 with creating a task profile by associating task periods with browser window selections. In an embodiment, task profiler 126 can use various methods to associate task periods with browser window selections based on the stored information for activities on computing device 120.

In an embodiment, task profiler 126 may be configured to associate browser window selections occurring within a predetermined time interval of an identified task period with the task period. For example, a task profiler 126 may be configured to identify the browser window activities, shown in FIG. 9A as ID 0003 and ID 0004, as occurring within a predetermined time (e.g., less than 10 minutes) of an identified 8:15 am task period and to associate the identified activities with the 8:15 am task period.

In an embodiment, task profiler 126 may be configured to associate browser window selections occurring during the life time of an activity associated with a task period. For example, in FIG. 9C, the activity associated with activity ID 0029 is the launch of a programming IDE. During the time between the launch and termination of the IDE, three browser windows were selected. Task profiler 126 can be configured to associate the three browser window selections identified in activities 0030, 0031, and 0032 with one or more task periods associated with activity ID 0029.

In an embodiment, task profiler 126 can be configured to generate a task profile by storing correlations of the identified task periods with the associated trigger actions, repetition frequency, and tab window URL information for the associated browser windows. In an embodiment, the generated task profile may be similar to data structure 700 shown in FIG. 7 and described above.

In an embodiment, task profiler 126 can be configured to present the generated task profile in a user interface displayed on computing device 102 and to receive user input via the user interface for modifying information in the task profile. For example, a user may specify or modify a descriptive task name, a repetition period (e.g. daily, weekly, on weekdays, or monthly), the triggers for a task period, or information for the set of tabs by interacting with an interface provided on the display of computing device 102.

Embodiments shown in FIGS. 1-9, or any part(s) or function(s) thereof, may be implemented using hardware, software modules, firmware, tangible computer readable media having instructions stored thereon, or a combination thereof and may be implemented in one or more computer systems or other processing systems.

Figure 10:
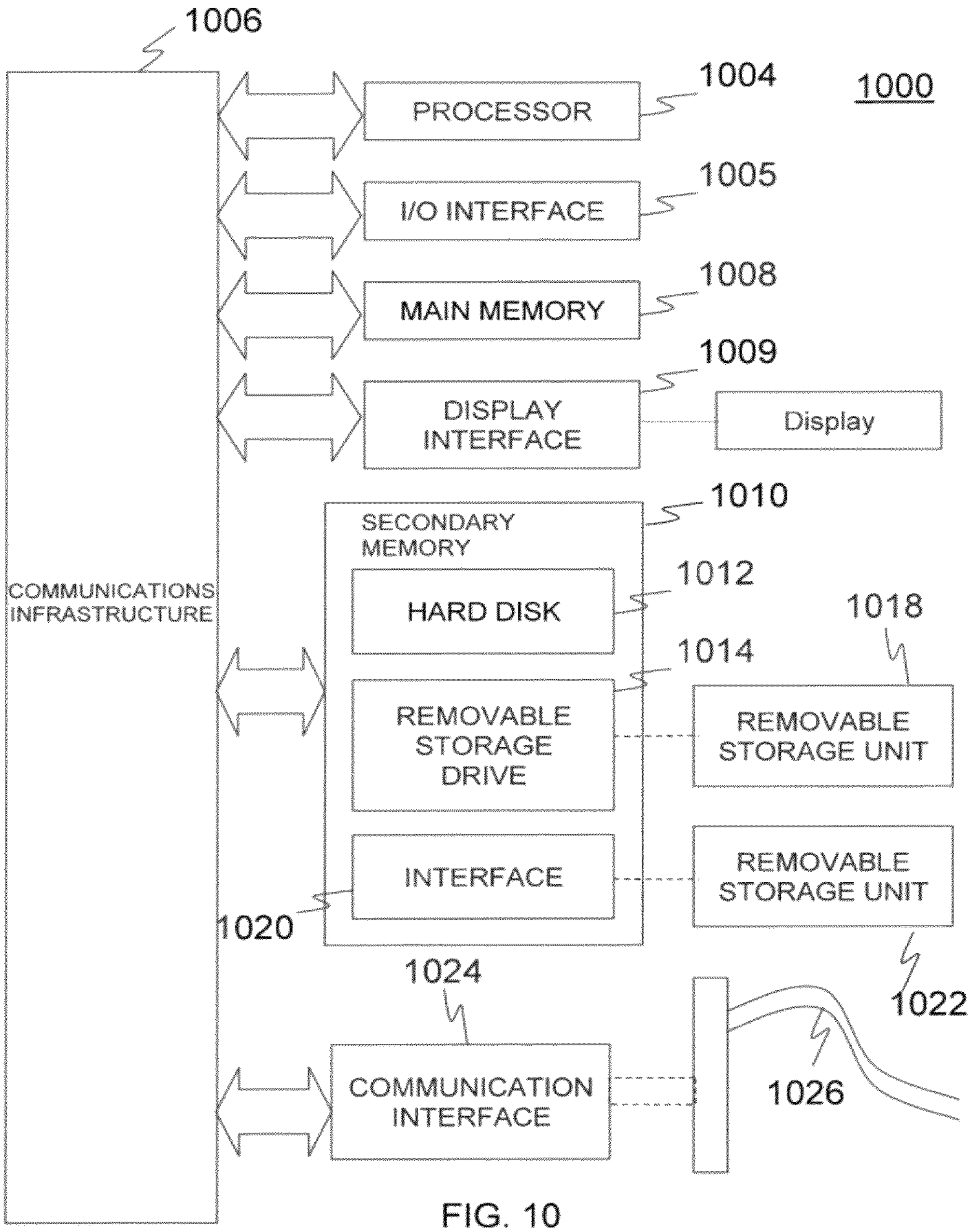
FIG. 10 is an illustration of an example computer system in which embodiments can be implemented.

FIG. 10 illustrates an example computer system 1000 in which embodiments, or portions thereof, may be implemented as computer-readable code. For example, computing device 102 and task based tab management system 120 in FIG. 1, and the browser in FIGS. 2 and 3, can be implemented in computer system 1000 using hardware, software, firmware, tangible computer readable media having instructions stored thereon, or a combination thereof and may be implemented in one or more computer systems or other processing systems. Hardware, software, or any combination of such may embody any of the modules and components in FIGS. 1, 2, and 3.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments are described in terms of this example computer system 1000. After reading this description, it will become apparent to a person skilled in the relevant art how to implement embodiments using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1004 may be a special purpose or a general purpose processor device. As will be appreciated by persons skilled in the relevant art, processor device 1004 may also be a single processor in a multi-core/multiprocessor system, such system operating alone, or in a cluster of computing devices operating in a cluster or server farm. Processor device 1004 is connected to a communication infrastructure 1006, for example, a bus, message queue, network, or multi-core message-passing scheme.

Computer system 1000 also includes a main memory 1008, for example, random access memory (RAM), and may also include a secondary memory 1010. Secondary memory 1010 may include, for example, a hard disk drive 1012, removable storage drive 1014. Removable storage drive 1014 may comprise a floppy disk drive, a magnetic tape drive, an optical disk drive, a flash memory, or the like. The removable storage drive 1014 reads from and/or writes to a removable storage unit 1018 in a well known manner. Removable storage unit 1018 may comprise a floppy disk, magnetic tape, optical disk, etc. which is read by and written to by removable storage drive 1014. As will be appreciated by persons skilled in the relevant art, removable storage unit 1018 includes a computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1000.

Computer system 1000 may also include a communications interface 1024. Communications interface 1024 allows software and data to be transferred between computer system 1000 and external devices. Communications interface 1024 may include a modem, a network interface (such as an Ethernet card), a communications port, a PCMCIA slot and card, or the like. Software and data transferred via communications interface 1024 may be in the form of signals, which may be electronic, electromagnetic, optical, or other signals capable of being received by communications interface 1024. These signals may be provided to communications interface 1024 via a communications path 1026. Communications path 1026 carries signals and may be implemented using wire or cable, fiber optics, a phone line, a cellular phone link, a radio frequency (RF) link or other communications channels.

In this document, the terms "computer program medium" and "computer usable medium" are used to generally refer to storage media such as removable storage unit 1018, removable storage unit 1022, and a hard disk installed in hard disk drive 1012. Computer program medium and computer usable medium may also refer to memories, such as main memory 1008 and secondary memory 1010, which may be memory semiconductors (e.g. DRAMs, etc.).

Computer programs (also called computer control logic) are stored in main memory 1008 and/or secondary memory 1010. Computer programs may also be received via communications interface 1024. Such computer programs, when executed, enable computer system 1000 to implement embodiments as discussed herein. In particular, the computer programs, when executed, enable processor device 1004 to implement the processes of embodiments, such as the stages in the methods illustrated by flowcharts 400, 500, and 600 of FIGS. 4, 5, and 6, respectively, discussed above. Accordingly, such computer programs represent controllers of the computer system 1000. Where embodiments are implemented using software, the software may be stored in a computer program product and loaded into computer system 1000 using removable storage drive 1014, interface 1020, and hard disk drive 1012, or communications interface 1024. Users may interact with computer system 1000 through I/O interface 1005 and a display coupled to display interface 1009.

Embodiments may also be directed to computer program products comprising software stored on any computer useable medium. Such software, when executed in one or more data processing devices, causes a data processing device(s) to operate as described herein. Embodiments employ any computer useable or readable medium. Examples of non-transitory computer readable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.). Additional computer readable medium can include communication mediums (e.g., wired and wireless communications networks, local area networks, wide area networks, intranets, etc.).

As would be understood by a person skilled in the art based on the teachings herein, several variations of the above described features of systems and methods for managing browser tab windows can be envisioned. These variations are within the scope of embodiments. For example, one skilled in the art can envision several variations to the generation and distribution of encryption keys as described in methods 400, 500, and 600 of FIGS. 4, 5, and 6, respectively (e.g., using task based tab management system 120, computing device 102, and browser 110). For the purpose of illustration only and not limitation, the variations below are provided.

In a variation, the task profile for a user may be generated based on the user's activities on multiple computers. In an embodiment, a user's task profile can be maintained on a server, and task profiler 126 may detect activities associated with the user that occur on client computers connected to the server for the purpose of updating the user's task profile. Tab adjuster 124 may use the updated profile to manage browser windows on the a particular computer that the user is currently using.

In another variation, the tasked based tab management system may manage tabs on a client that are associated with windows each displaying one of multiple modes of a single application. Tab adjuster 124 may select and adjust sets of tabs on the client based on a task profile, so that windows for an appropriate mode are emphasized based on a detected task period.

The Summary and Abstract sections may set forth one or more but not all exemplary embodiments as contemplated by the inventor(s), and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for task-based web page tab management, comprising:
- detecting one or more actions on a computing device;
- determining a current task period based on a comparison of the one or more detected actions to one or more trigger actions, wherein the current task period is defined by a start time and an end time;
- selecting tabs of a plurality of displayed tabs to adjust based on the current task period and a task profile retrieved from a task database, the task profile corresponding to the current task period,
- wherein the task profile includes one or more previously determined task periods, the previously determined task periods each associated with one or more candidate tabs, each candidate tab associated with application launch information,
- wherein the selected tabs are associated with application launch information that corresponds to the application launch information of the candidate tabs in the task profile;
- adjusting the display of the selected tabs to emphasize at least one of the selected tabs during the current task period and to hide at least one of the selected tabs during the current task period; and
- adjusting, subsequent to the end time of the current task period, the display of the selected tabs to make visible the at least one of the selected tabs that is hidden during the current task period.

2. The method of claim 1, further comprising creating the task profile based on user behavior associated with a task.

3. The method of claim 2, wherein the creating includes tracking a time of the task.

4. The method of claim 2, wherein the creating includes tracking the content of web pages in tabs associated with the task.

5. The method of claim 2, wherein the creating includes tracking tab spawning behavior associated with the task.

6. The method of claim 2, wherein the creating includes tracking recently focused tabs related to the task.

7. The method of claim 1, wherein the adjusting includes clustering the selected tabs.

8. The method of claim 1, wherein the adjusting includes adjusting the size of the selected tabs.

9. The method of claim 1, wherein the adjusting includes adjusting the color of the selected tabs.

10. The method of claim 1, wherein the adjusting includes adjusting the shape of the selected tabs.

11. The method of claim 1, wherein:
- the one or more detected actions are associated with a time of day; and the determining the current task period step includes determining the current task period based on a comparison of the time of day associated with the detected actions and a time of day associated with the one or more trigger actions.

12. The method of claim 1, wherein:

the one or more detected actions include a user tab selection; and the determining the current task period step includes determining the current task period based on a comparison of the user tab selections to one or more trigger actions.

13. A system for task-based web page tab management, comprising:

a task period determiner implemented with a computing device configured to:

detect one or more actions on a computing device;

determine a current task period based on a comparison of the one or more detected actions to one or more trigger actions, wherein the current task period is defined by a start time and an end time; and a tab adjuster implemented with the computing device and configured to:

select tabs of a plurality of displayed tabs to adjust based on the current task period and a task profile retrieved from a task database, the task profile corresponding to the current task period, wherein the task profile includes one or more previously determined task periods, the previously determined task periods each associated with one or more candidate tabs, each candidate tab associated with application launch information, wherein the selected tabs are associated with application launch information that corresponds to the application launch information of the candidate tabs in the task profile;

adjust the display of the selected tabs to emphasize at least one of the selected tabs during the current task period and to hide at least one of the selected tabs during the current task period; and adjust, subsequent to the end time of the current task period, the display of the selected tabs to make visible the at least one of the selected tabs that is hidden during the current task period.

14. The system of claim 13, further comprising a task profiler configured to create the task profile based on user behavior associated with a task.

15. The system of claim 14, wherein the task profiler is further configured to track a time of the task.

16. The system of claim 14, wherein the task profiler is further configured to track the content of web pages in tabs associated with the task.

17. The system of claim 14, wherein the task profiler is further configured to track tab spawning behavior associated with the task.

18. The system of claim 14, wherein the task profiler is further configured to track recently focused tabs related to the task.

19. The system of claim 13, wherein the tab adjuster is further configured to cluster the selected tabs.

20. The system of claim 13, wherein the tab adjuster is further configured to adjust the size of the selected tabs.

21. The system of claim 13, wherein the tab adjuster is further configured to adjust the color of the selected tabs.

22. The system of claim 13, wherein:

the one or more detected actions are associated with a time of day; and the task period determiner is further configured to determine the current task period based on a comparison of a time of day associated with the detected actions and a time of day associated with the one or more trigger actions.

23. The system of claim 13, wherein:

the one or more detected actions include a user tab selection; and the task period determiner is further configured to determine the current task period based on a comparison of one or more user tab selections to one or more trigger actions.

24. The system of claim 13, wherein:

the tab adjuster is further configured to adjust the display to make visible at least one tab during the current task period, and the at least one tab is hidden from the display prior to the start time of the current task period.

25. A computer-implemented method for task-based web page tab management, comprising:

detecting one or more actions on a computing device;

determining a current task period based on a comparison of the one or more detected actions to one or more trigger actions, wherein the current task period is defined by a start time and an end time;

selecting a first set of one or more tabs of a plurality of displayed tabs to adjust based on the current task period and a task profile retrieved from a task database, the task profile corresponding to the current task period, wherein the task profile includes one or more previously determined task periods, the previously determined task periods each associated with one or more candidate tabs, each candidate tab associated with application launch information, wherein the one or more selected tabs are associated with application launch information that corresponds to the application launch information of the candidate tabs in the task profile;

selecting a second set of one or more tabs of the plurality of displayed tabs to adjust based on the current task period;

selecting a third set of one or more tabs of the plurality of displayed tabs to adjust based on the current task period;

adjusting the display of the first, second, and third sets of selected tabs, wherein:

the first set of tabs is adjusted to emphasize the first set of tabs during the current task period, the second set of tabs is adjusted to deemphasize the second set of tabs during the current task period, and the third set of tabs is adjusted to hide the third set of tabs during the current task period; and adjusting the display to make visible the third set of tabs subsequent to the end time of the current task period.

26. A system for task-based web page tab management, comprising:

a task period determiner implemented with a computing device configured to:

detect one or more actions on the computing device;

determine a current task period based on a comparison of the one or more detected actions to one or more trigger actions, wherein the current task period is defined by a start time and an end time; and a tab adjuster implemented with the computing device and configured to:

select a first set of one or more tabs of a plurality of displayed tabs to adjust based on the current task period and a task profile retrieved from a task database, the task profile corresponding to the current task period, wherein the task profile includes one or more previously determined task periods, the previously determined task periods each associated with one or more candidate tabs, each candidate tab associated with application launch information, wherein the one or more selected tabs are associated with application launch information that corresponds to the application launch information of the candidate tabs in the task profile;

select a second set of one or more tabs of the plurality of displayed tabs to adjust based on the current task period;

select a third set of one or more tabs of the plurality of displayed tabs to adjust based on the current task period;

adjust the display of the first, second, and third sets of selected tabs, wherein:

the first set of tabs is adjusted to emphasize the first set of tabs during the current task period, the second set of tabs is adjusted to deemphasize the second set of tabs during the current task period, and the third set of tabs is adjusted to hide the third set of tabs during the current task period; and adjust the display to make visible the third set of tabs subsequent to the end time of the current task period.

* * * * *